June 8, 1926.
J. P. RICHMOND
1,588,336
LUBRICATING APPARATUS
Filed Oct. 6, 1925
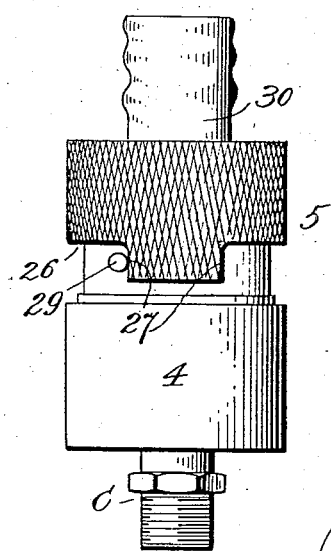
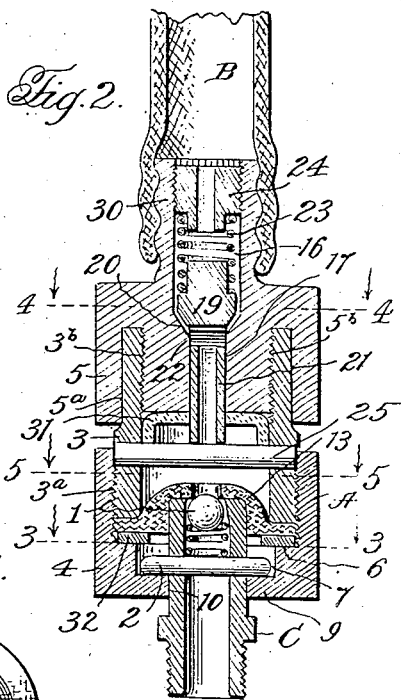

Patented June 8, 1926.

1,588,336

UNITED STATES PATENT OFFICE.

JESSE P. RICHMOND, OF MEMPHIS, TENNESSEE.

LUBRICATING APPARATUS.

Application filed October 6, 1925. Serial No. 60,848.

This invention relates to improvements in lubricating apparatus for supplying lubricant to grease cups.

The object of the invention is to provide an improved apparatus of the character referred to; to provide for such apparatus improved coupling means of a simple, practical nature, economical to manufacture, capable of being quickly attached to and separated from the tubes of grease cups, and that will successfully resist leakage of lubricant; and to provide improved coupling means of this kind with improved valve means of simple, efficient construction for controlling the flow of lubricant from the apparatus.

The invention, with other objects and advantages thereof, and the particular construction, combination and arrangement of parts comprising the same, will be understood from the hereinafter contained detail description, when considered in connection with the accompanying drawings, forming part hereof and illustrating one embodiment of the invention.

In the drawings:

Figure 1 is a side elevation of coupling means constructed in accordance with the present invention, the same being shown attached to a tube of a grease cup.

Fig. 2 is a longitudinal section, on an enlarged scale.

Fig. 3 is a section on the line 3—3 of Figure 2.

Fig. 4 is a section on the line 4—4 of Figure 2.

Fig. 5 is a section on the line 5—5 of Figure 2.

Fig. 6 is a detail perspective of the gasket that cooperates with the grease cup tube.

Fig. 7 is a transverse section of the gasket illustrated in Figure 6.

The invention comprehends an improved nozzle or coupling means for the free end of a flexible outlet or delivery conduit including a casing open at its outer end to permit the end portion of a grease cup tube to enter the same, means for detachably connecting the nozzle or coupling to a grease cup tube, and a hollow gasket within the casing adapted to surround the outer end portion of the grease cup tube and to fit and be held by fluid pressure within the conduit tight against the side wall and end wall of the grease cup tube, the gasket being constructed to extend well down over the side of the grease cup tube and being provided with a central opening to register with the bore of the tube. The invention also contemplates a coupling of the character outlined in which the means for detachably connecting the same to the grease cup tube is of the bayonet joint type and in which the parts are arranged so that the gasket through its resilience and also indirectly through the fluid pressure functions to maintain the detachable connecting means in operative engagement against accidental displacement. The invention further contemplates a valve within the casing operable through a rotary adjustable part of the casing to control the flow of fluid through the casing.

While a specific embodiment of the invention is illustrated in the drawings, it will of course be understood, that minor changes and modifications of the particular construction shown, may be made, and the invention embodied in other forms as will appeal to those skilled in the art and falling within the scope of the appended claims, without departing from the spirit of the invention.

Referring to a detail description of the particular embodiment of the invention illustrated in the drawings, A designates as a whole the nozzle or coupling secured to the free end of a flexible conduit B leading from any suitable form of grease gun device (not shown) and adapted to be connected with a grease cup tube C or the like.

The grease cup tube C, which is adapted to be connected to the bearings to be lubricated, is of conventional form having a check valve 1, the outer end of the tube C being flanged inwardly, as shown, to provide a seat for the valve 1, and said tube being provided with a transverse pin 2, secured to and having its ends projecting outwardly from the wall of the tube.

The particular embodiment of my improved nozzle or coupling, illustrated in the drawing, comprises a casing A including an intermediate sleeve member 3, and end members 4, 5, detachably connected therewith. The end member 4, which is cup shaped, is recessed interiorly, as shown, to provide an annular shoulder 6 intermediate its ends with a chamber 7 inwardly thereof of less diameter than the interior diameter of the remaining interior part 8 of said member. The end wall 9 of the cup shaped end member is provided with a central opening 10 and adjoining radial notches 11 to permit the outer end portion of the grease cup tube C to enter the casing A, and the engagement of the projecting end portions of the transverse pin 2 of the tube C with the end wall of the cup shaped member 4, the projecting end portions of the transverse pin 2 cooperating with the notched end wall 9 of the cup shaped member to provide bayonet like quick detachable means for connecting the casing A to the grease cup tube C, the connection being made by entering the end portion of the grease cup tube C through the central opening 10 in the end wall 9 of the cup shaped member, the projecting end portions of the pin 2 passing through the radial notches 11 and being engaged over the end wall 9 of the cup shaped member by a partial turn of the latter. 12 designates a stop lug or projection on the inner face of the end wall 9 of the cup shaped member to cooperate with the projecting end portions of the transverse pin 2, of the grease cup tube C. The intermediate sleeve member 3 fits within and has an adjustable threaded connection with the cup shaped member 4, the part 8 of said cup shaped member being interiorly threaded and the intermediate sleeve member 3 having an external threaded portion 3ª to engage therewith. Within the casing is a gasket adapted to provide a fluid tight seal between the end portion of the grease cup tube C and the wall of the casing. The gasket comprises a main body part 13 and an annular flange 14 projecting from the marginal portion thereof, the gasket being arranged with its annular flange 14 tightly clamped between the annular shoulder 6 of the cup shaped member 4 and one end of the intermediate sleeve member 3. The main hollow part 13 of the gasket is adapted (as illustrated in Figure 2 of the drawings) to surround the end portion of the grease cup tube C and to fit and be tightly held by fluid pressure within the conduit close against the side wall and end wall of the grease cup tube C, the gasket extending well down over the side wall of the tube C and being provided with a central opening 15 to register with the bore of the tube, the arrangement of the parts being such that when the grease cup tube is coupled with the casing A, the outer end of the grease cup tube C is pressed tightly against the wall of the gasket and the gasket directly through its resiliency and indirectly through the fluid pressure functions to maintain the projecting end portions of the transverse pin 2 of the grease cup tube C pressed tightly against and in engagement with the end wall of the cup shaped member 4. The gasket is constructed of leather or any other suitable material.

The end member 5 is provided with an annular recess 5ª leading inwardly from one end thereof to interfit with one end of the intermediate sleeve member 3, and said end member 5 has a rotary adjustable connection with the sleeve member 3. In the particular construction shown the intermediate sleeve member 3 has an interiorly threaded portion 3ᵇ engaging a threaded portion 5ᵇ on one side wall of its annular recess 5ª. The end member 5 is provided with a valve chamber 16 leading inwardly from one end thereof and a bore 17 extending longitudinally therethrough from the inner end of said chamber. Arranged for reciprocation within the chamber 16 is a valve 19 adapted to cooperate with a seat 20 at the inner end of said chamber, said valve having a tubular stem 21 provided with inlet ports 22 at its upper end. 23 designates a coiled spring for pressing the valve 19 to its seat 20, the spring 23 being interposed between one end of the valve 19 and a plug 24 detachably secured within the outer end of the chamber 16. 25 designates a pin secured to and extending across the interior of the intermediate sleeve member 3. By partial rotation of the end member 5 relative to the intermediate sleeve member 3 the end of the valve stem 21 will be brought into engagement with the transverse pin 25 and the valve 19 lifted from its seat 20 against the tension of the spring 16 to open the passage through the coupling, the valve being shown in open position in Figure 2 of the drawings. The end member 5 is recessed at 26 to provide spaced shoulders 27, that cooperate with a lug 29 on the intermediate sleeve member 3 to limit the rotary movement of the end member 5 in the operation of the valve 19. The member 5 is shown provided with a reduced nipple portion 30 for connection with the flexible conduit B. The end portion of the flexible conduit B may be tightly secured to the nipple portion 30, as shown, or any of the conventional forms of swiveling connections may be employed between the end of the flexible conduit B and the nipple portion 30 that will permit of rotary movement of the end member 5 relative to the end of the flexible conduit B while providing for a fluid tight connection between the parts.

31 designates a cup shaped gasket of leather or the like arranged above the transverse pin 25 adjacent an end face of the end member 5 to provide a fluid tight seal between the adjacent walls of the intermediate member 3 and the wall of the annular recess 5ª of the end member 5.

Interposed between the shoulder 6 of the cup shaped end member 4 and the annular gasket flange 14 is a metal washer 32, said washer projecting inwardly, as shown, beyond the shoulder 6.

It will be noted that by the special construction and arrangement of parts hereinbefore set forth, coupling means of a simple efficient nature is provided. The gasket that cooperates with the end of the grease cup tube completely surrounds the end portion of the tube and fits and is held by the fluid pressure within the conduit tightly against the side wall and end wall of the grease cup tube, the gasket being constructed to extend well down over the side of the tube so that an efficient seal between the end of the tube and the wall of the casing against leakage is afforded. The use of springs in connection with the gasket is avoided, the parts can be quickly and easily assembled, the construction being of a character to be durable and efficient in use and one that can be produced at low cost.

What I claim is:

1. A coupling of the class described, comprising a casing adapted to be secured to the free end of a flexible delivery conduit, said casing being open at its outer end to permit the end portion of a grease cup tube or the like to enter the same, means for detachably connecting the casing to the grease cup tube, and a hollow gasket within the casing adapted to surround the outer end portion of the grease cup tube and to fit against the side wall and completely overlie the end wall of the same, said gasket being adapted to be tightly held by fluid pressure within the conduit close against the side wall and completely over and against the end wall of the end portion of the grease cup tube, the gasket having a central opening to align with the bore of the grease cup tube.

2. A coupling of the class described, comprising a casing adapted to be secured to the free end of a flexible delivery conduit, said casing being open at its outer end to permit the end portion of a grease cup tube or the like to enter the same, means for detachably connecting the casing to the grease cup tube, and a hollow gasket within the casing secured thereto and adapted to surround the outer end portion of the grease cup tube and to fit against the side wall and completely overlie the end wall of the same, said gasket being adapted to be tightly held by fluid pressure within the conduit close against the side wall and completely over and against the end wall of the end portion of the grease cup tube, the gasket having a central opening to align with the bore of the grease cup tube.

3. A coupling of the class described, comprising a casing adapted to be secured to the free end of a flexible delivery conduit, said casing being open at its outer end to permit the end portion of a grease cup tube or the like to enter the same, means for detachably connecting the casing to the grease cup tube, a gasket within the casing having a main hollow body part and an annular flange projecting outwardly from the marginal portion thereof, and means for securing the annular flange of the gasket to the casing, said gasket being adapted to surround the outer end portion of the grease cup tube and to fit against the side wall and completely overlie the end wall of the same, said gasket being adapted to be tightly held by fluid pressure within the gasket close against the side wall and completely over and against the end wall of the end portion of the grease cup tube, the gasket having a central opening to align with the bore of the grease cup tube.

4. A coupling of the class described, comprising a casing adapted to be secured to the free end portion of a flexible delivery conduit, said casing comprising a cup shaped member having an opening in its bottom wall to permit the end portion of a grease cup tube to enter therethrough and having an annular shoulder near its bottom wall, a gasket within the casing having a main tubular body part and an annular flange projecting outwardly from the marginal portion thereof, a sleeve member fitting within and having an externally threaded portion to engage an internally threaded portion of the cup shaped member, one end of said sleeve member being adapted to cooperate with the shoulder of the cup shaped member to clamp the annular flange of the gasket to the cup shaped member, and means for detachably securing the casing to the grease cup tube, the gasket being adapted to surround the outer end portion of the grease cup tube and to fit against the side wall and completely overlie the end wall of the same, said gasket being adapted to be tightly held by fluid pressure within the conduit close against the side wall and completely over and against the end wall of the end portion of the grease cup tube, the gasket having a central opening to align with the bore of the grease cup tube.

5. A coupling of the class described, comprising a casing adapted to be secured to the free end of a flexible delivery conduit, said casing being open at its outer end to permit the end portion of a grease cup tube or the like to enter the same, means for detachably connecting the casing to the grease cup tube, and a hollow gasket within the casing adapted to surround the outer end portion of the grease cup tube and to fit against the side wall and completely overlie the end wall of the same, said gasket being adapted to be tightly held by fluid pressure within the conduit close against the side wall and completely over and against the end wall of the end portion of the grease cup tube, the gasket having a central opening to align with the bore of the grease cup tube, said gasket opening being of a diameter less than the interior diameter of the bore of the grease cup tube.

In testimony whereof I hereunto affix my signature.

JESSE P. RICHMOND.